# 2,825,744

VAPOR PHASE OXIDATION

Tor Halfdan Smedslund, Chicago, Ill., assignor to The Stepan Chemical Company, Chicago, Ill., a corporation of Illinois No Drawing. Application March 27, 1956
Serial No. 574,072

6 Claims. (Cl. 260—607)

This invention relates to a method for the manufacture of sulfoxides, and more particularly, to an improved process for the manufacture of low molecular weight sulfoxides from the corresponding sulfides.

United States Letters Patent No. 2,581,050, issued to me on January 1, 1952, relates to the vapor phase oxidation dimethyl sulfide to dimethyl sulfoxide using an oxygen containing gas which also includes a small amount of an oxygen-transmitting nitrogen oxide (such as $NO_2$), using reaction temperatures sufficient to maintain the dimethyl sulfide in the vapor phase. In this process air is usually used as the oxygen-containing gas; and the sulfide and air, plus the catalyst, are ordinarily admixed at room temperature or slightly thereabove. As soon as these ingredients are admixed, reaction begins with consequent heating of the gas mixture, so the gas mixture is passed into a reaction zone or reactor shortly after it is made up.

In the reaction zone, the temperature of the mixture rises from perhaps 100–120 at the entrance to as much as 190–200 in the middle of its path of travel through the reactor and then falls off to approximately 150–160° F. near the exit of the reactor. In general, it is not desirable to permit the reaction temperatures to exceed 200° F., because of side reactions, and for this reason the amount of catalyst used is selected so as to maintain a rate of oxidation that is practical but not so fast as to cause increases in the reaction temperature above 200° F.

The instant invention is based in part on a discovery of a method for substantially increasing the yield using the operating conditions hereinbefore described. In the practice of the instant invention a cooled surface is maintained within the reaction zone, such surface being cooled to at least 35° F. to 100° F. and preferably below room temperature, i. e., 78–80° F. In any event, the surface is cooled to substantially below the gas temperature in the reactor or reaction zone. It will be appreciated that the cooled surface has only a relatively slight cooling effect, if any, upon the gas mass in the reactor. The reaction temperatures in the vapor phase are maintained as previously indicated. The cooled surface does afford a surface on which the sulfoxide product may condense to form a liquid film.

Although certain theories are believed to explain the improved results obtained in the practice of the instant invention the striking results speak for themselves. For example, using ordinary operating conditions such as those hereinbefore described in the absence of a cooled surface, a yield of about 75% of theoretical can be obtained. Using comparable operating conditions with cooling of the surface to 100° F., it is found that the yield is 85%. Under the same operating conditions, cooling the surface to 76° F. gives a yield of 91% and cooling the surface to 50° F. gives yields of 98–100%.

It is, therefore, an important object of the instant invention to provide an improved method for the manufacture of sulfoxides.

It is a further object of the instant invention to provide an improved process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures above room temperature while simultaneously exposing the mixture to a surface cooled to below room temperature.

Other and further objects, features and advantages of the present invention will become apparent to those skilled in the art from the following detailed disclosure thereof.

The invention consists in a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures of 120° F. to 200° F. while simultaneously exposing the mixture to a surface cooled to 35° F. to 100° F., and preferably to 35° F. to 60° F.

The sulfides which may be used in the practice of the instant invention include the low molecular weight dialkyl sulfides having the following formula:

wherein each R is the same or a different $C_1$–$C_4$ alkyl group. Such dialkyl sulfides include dimethyl sulfide, methyl ethyl sulfide, methyl propyl sulfide, methyl isopropyl sulfide, methyl n-butyl sulfide, methyl secondary butyl sulfide, etc.; diethyl sulfide, ethyl propyl sulfide, etc.; dipropyl sulfide, etc.; and dibutyl sulfide, etc.

The sulfides may also be heterocyclic compounds where S is a nuclear atom. Such compounds include 5 to 6 member rings having 1 to 2 nuclear S atoms and the remainder C atoms, in saturated or unsaturated rings, with 1 to 2 substituents on the C atoms, preferably C—C alkyl substituents. Typical types of compounds are based on the thiophene and tetramethylene sulfide nuclei:

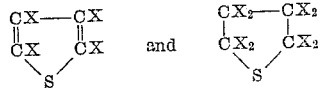

wherein each X is H or a $C_1$–$C_4$ alkyl group but not more than 2 X's are alkyl groups and the remainder are H's. Examples include tetramethylene sulfide, 1-methyl tetramethylene sulfide, 2-methyl tetramethylene sulfide, 1,3-dimethyl tetramethylene sulfide, etc. up to 1-butyl tetramethylene sulfide.

Another heterocyclic compound is based on a 6 membered ring nucleus:

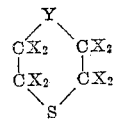

wherein Y may be S or $CX_2$ and the X's have the meaning hereinbefore given. Examples include pentamethylene sulfide, 1-methyl pentamethylene sulfide, 2-methyl pentamethylene sulfide, 3-methyl pentamethylene sulfide, 1,2-dimethyl pentamethylene sulfide, etc. up to the butyl pentamethylene sulfides; and dithiane (i. e. diethylene disulfide), 1-methyldithiane, etc. up to the butyl dithianes.

Members of these groups which are normally solids can be dissolved in, for example, dimethyl sulfoxide to provide a liquid compositions of the sulfide that is oxidized in the process of the invention.

In the practice of the instant invention, the organic sulfide is oxidized in the vapor phase and, for this reason, it is preferable to carry out the instant invention using a sulfide that normally exists in the gaseous phase at temperatures within the range of 100° F. to 200° F. Higher boiling sulfides may be used because of the relatively high vapor pressure of the organic sulfides.

In the preferred procedure air, oxygen or other oxygen-containing gas is admixed with the organic sulfide by bubbling the oxygen-containing gas through the sulfide in the liquid phase at temperatures of about room temperature or slightly above (but preferably not above about 120° F. until the mixture is introduced into the reactor). For economic reasons air is preferred as the oxygen-containing gas. Once the air, organic sulfide and catalyst have been admixed, the reaction starts with consequent heating. The reaction mixture may thus be prepared at substantially room temperature and will increase in temperature to as much as 120–140° F. as it is transferred to the reactor.

The amount of air used is preferably as near to the stoichiometric amount as possible. A deficiency of oxygen causes some of the sulfide to remain unoxidized whereas an excess of oxygen tends to cause undesired decrease in catalyst concentration. By bubbling air through a liquid such as dimethyl sulfide, it is possible to obtain a saturated mixture wherein the sulfide-oxygen ratio is that desired.

The amounts and types of oxygen transmitting nitrogen oxides used in the practice of the instant invention are described in detail in said U. S. Letters Patent No. 2,581,050 and need not be described with further particularity herein.

Such gases include NO, $NO_2$, $N_2O_3$, $N_2O_4$, etc., but the predominating catalytic function is generally thought of on the basis of $NO_2$, as indicated in the following equations representing the reaction which is believed to take place:

(1) 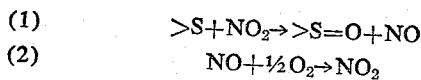
$$>S + NO_2 \rightarrow\, >S=O + NO$$
(2)
$$NO + \tfrac{1}{2}O_2 \rightarrow NO_2$$

wherein $>S$ is the sulfide S atom and $>S=O$ is the sulfoxide grouping. It will be noted that the actual oxidation of the sulfide to the sulfioxide is believed to be caused by reaction between the sulfide S atom and $NO_2$; but the resulting NO is instantly regenerated to $NO_2$ by the the presence of the oxygen in the air. As will be appreciated, only a small amount of the oxygen-transmitting nitrogen oxide, such as about 5 to about 15% by volume of the oxygen employed, is employed according to said U. S. Letters Patent No. 2,581,050, and the bulk of the oxidizing gas is oxygen from the air, which is added in an amount just sufficient to complete (with the $NO_2$ or equivalent nitrogen oxide) the oxidation of the sulfide.

As previously indicated, the reaction zone is provided with a surface that is cooled to 35° F. to 100° F. and preferably to below room temperature, or within the range 35° F. to 60° F. The cooling surface may be provided by metal tubes passing through the reactor and connected to cooling water or some other heat exchange fluid; or the reactor itself may be in the form of a relatively small tube which is cooled externally by water or some other heat exchange fluid such as brine. The vapor temperature in the reaction zone remains within the range of 100° F. or 120° F. to about 200° F., but the exposed cooling surface in the reaction zone is substantially that of the heat exchange fluid medium which is in contact with the non-exposed or back side of such surface. The use of normal heat exchange structures involving highly heat conductive metal tubes, such as stainless steel tubes, will necessarily result in a slight temperature gradient across the tube thicknesses, so that the temperature of the cooling water on the back side of the tube will doubtlessly be slightly lower than the temperature of the exposed surface of the tube in the reaction chamber. Since the heat insulative effect of the gases is extremely high compared to the conductivity of the metal body of the tube, it can be assumed that the temperature of the cooling water is quite close to the actual temperature of the exposed cooling surface and this temperature is used herein to indicate the temperature of the cooling surface. An additional reason for this is that the actual temperature of the cooling surface within the reactor is almost impossible to measure in view of the fact that condensation of the sulfoxide is continuously taking place so as to form a liquid film on the cooling surface and this phenomenon is further complicated by the fact that it is believed that the reaction is catalyzed by this film, so that heat of reaction is another factor involved in determining the temperature of the film and the temperature of the cooling surface upon which the film is deposited.

The cooled surface in the reactor should be at least about 50 square centimeters per liter of the volume of the reactor (which is also per liter of the gas mixture in the reaction zone). The cooled surface may range from about 50 to about 5000 square centimeters per liter in the practice of the instant invention, but it is preferably in the neighborhood of 2000 square centimeters per liter of reaction mixture in the zone.

The invention may be demonstrated as follows:

A reaction mixture is prepared by evaporating a sulfide into an air current containing nitrogen dioxide wherein the following proportions (per unit of time) are used:

| | | |
|---|---|---|
| Dimethyl sulfide | g. | 0.7 |
| Air | ml. | 680 |
| $NO_2$ | ml. | 45 |

The mixture is passed through an elongated stainless steel reaction chamber having a plurality of stainless steel tubes extending therethrough, with the external surface area of such tubes being 200 square centimeters per liter of volume of the reaction chamber. The reaction mixture is passed through the reaction chamber at a rate approximately sufficient to produce dimethyl sulfoxide at a rate of 100 pounds per hour. The temperature of the reaction mixture at the entrance end of the chamber is about 140° F. As the reaction mixture progresses through the chamber the temperature rises to about 190° F. at approximately the middle of the chamber and then falls off to about 150–160° F. at the exit end of the chamber.

Using the foregoing operating conditions, no cooling fluid is passed through the tubes in the chamber, and the crude product is removed from the chamber. After purification of this product (wherein the dimethyl sulfide is removed by heating the product to 150° F., the methane sulfonic acid therein is neutralized by adding slaked lime, and the dimethyl sulfoxide is distilled in vacuum) the yield of pure dimethyl sulfoxide is found to be 75% of the theoretical yield. Using the same procedure as that just described except that cooling water is passed through the tubes so as to give an exit cooling water temperature from the tubes of about 100° F., it will be found that the yield of pure dimethyl sulfoxide is 85% of the theoretical yield. In each case the cooling water is used, the water enters the tubes at the exit end of the chamber for the gas mixture and at a temperature of about 53° F., and the water exits from the tubes at the gas mixture entrance end of the chamber, so as to provide countercurrent flow. Substantially the temperature of the exit water is believed to be reached near the middle of the tubes, because the greatest amount of heat is imparted to the water through the tubes at this region of the chamber.

If the same procedure is repeated except that the cooling water is passed through the tubes more rapidly so as to obtain an exit temperature of 76° F., the yield of pure dimethyl sulfoxide is 91%.

If the same procedure is repeated except that the flow of cooling water is such that the exit temperature is 56–58° F., the resulting yield of pure dimethyl sulfoxide is 98% of the theoretical yield.

If pre-cooled water, at a temperature of approximately 45° F., is forced through the tubes so as to obtain an exit water temperature of 50° F., it is found that the yield of pure dimethyl sulfoxide is substantially 100% of the theoretical yield at a production rate of 109.5 pounds of dimethyl sulfoxide per hour. If the rate of flow is increased so that the production rate of dimethyl sulfoxide is 124 pounds per hour under otherwise the same conditions, it is found that the yield is 98.5% of the theoretical yield.

Comparable results are obtained with the indicated changes in the temperature of the cooling surface using each of the other sulfides hereinbefore set forth, and particularly ethyl sulfide, diethyl sulfide and tetramethylene sulfide.

Also, it is found that still better yields are obtained in the foregoing using cooled surfaces in the range of 1000–4000 (specifically 2000) square centimeters per liter.

It will be understood that modifications and variations may be effected without departing from the spirit and scope of the novel concepts of the present invention.

I claim as my invention:

1. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures above room temperature but not in excess of 200° F. the improvement which comprises exposing the mixture to a surface cooled to below room temperature, while carrying out the oxidation in said zone.

2. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures of 120° F. to 200° F. the improvement which comprises exposing the mixture to a surface cooled to 35° F. to 100° F., while carrying out the oxidation in said zone.

3. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures of 120° F. to 200° F., the improvement which comprises exposing the mixture to a surface cooled to 35° F. to 60° F., while carrying out the oxidation in said zone.

4. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures but not in excess of 200° F. above room temperature, the improvement which comprises exposing the mixture to a surface cooled to below room temperature, while carrying out the oxidation in said zone, said surface having an area of 50 to 5000 square cm. per liter of mixture in the zone.

5. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures of 120° F. to 200° F., the improvement which comprises exposing the mixture to a surface cooled to 35° F. to 100° F., while carrying out the oxidation in said zone, said surface having an area of 50 to 5000 square cm. per liter of mixture in the zone.

6. In a process for the manufacture of a low molecular weight sulfoxide from the corresponding sulfide by oxidation thereof, which comprises admixing in the vapor phase the sulfide, sufficient oxygen to oxidize the sulfide to the sulfoxide and an amount of oxygen transmitting nitrogen oxide at least sufficient to catalyze the oxidation; and passing the mixture through a reaction zone to carry out the oxidation in vapor phase at temperatures of 120° F. to 200° F., the improvement which comprises exposing the mixture to a surface cooled to 35° F. to 60° F., while carrying out the oxidation in said zone, said surface having an area of 50 to 5000 square cm. per liter of mixture in the zone.

References Cited in the file of this patent

UNITED STATES PATENTS 2,581,050    Smedslund _____ Jan. 1, 1952